United States Patent
Tsubata

(10) Patent No.: US 9,805,149 B2
(45) Date of Patent: Oct. 31, 2017

(54) ELECTROMAGNETIC FIELD ANALYSIS METHOD FOR ANISOTROPIC CONDUCTIVE MATERIAL

(71) Applicant: Fuji Jukogyo Kabushiki Kaisha, Tokyo (JP)

(72) Inventor: Hiroyuki Tsubata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/054,027

(22) Filed: Feb. 25, 2016

(65) Prior Publication Data

US 2016/0283620 A1    Sep. 29, 2016

(30) Foreign Application Priority Data

Mar. 25, 2015    (JP) .................................. 2015-062483

(51) Int. Cl.
  *G06F 7/60*       (2006.01)
  *G06F 17/10*      (2006.01)
  (Continued)

(52) U.S. Cl.
  CPC ..... *G06F 17/5009* (2013.01); *G01R 29/0814* (2013.01); *G06F 17/10* (2013.01);
  (Continued)

(58) Field of Classification Search
  CPC .. G06F 17/5009; G06F 17/5095; G06F 17/10; G06F 17/5018; G06F 2217/44; G01R 29/0814
  (Continued)

(56) References Cited

U.S. PATENT DOCUMENTS 6,236,202 B1 *  5/2001  Hanson .............. G01R 33/4625
                                              324/300
2010/0280778 A1   11/2010  Ohta

FOREIGN PATENT DOCUMENTS

EP    2 068 262 A1    6/2009
JP    2001-183404 A   7/2001
(Continued)

OTHER PUBLICATIONS

JPO Decision to Grant dated Oct. 4, 2016.
JPO Notification of Refusal dated May 20, 2016.
Extended European Search Report dated Aug. 31, 2016.

*Primary Examiner* — Saif Alhija
(74) *Attorney, Agent, or Firm* — McGinn IP Law Group, PLLC

(57) ABSTRACT

An electromagnetic field analysis method for an anisotropic conductive material obtained by laminating a first layer, in which a conductivity in a first direction is different from a conductivity in another direction, and a second layer, in which a conductivity in a second direction is different from that in another direction includes: grid-partitioning the first and second layers respectively with a first computational grid having a side extending in the first direction and a second computational grid having a side extending in the second direction; calculating an electromagnetic component of one of electric and magnetic fields in the second grid by interpolation from distribution of an electromagnetic component of the one of electric field and magnetic fields in the first grid; and calculating an electromagnetic component of the other field in the first grid by interpolation from distribution of an electromagnetic component of the other field in the second grid.

8 Claims, 8 Drawing Sheets

(51) Int. Cl.
*G06F 17/50* (2006.01)
*G01R 29/08* (2006.01)

(52) U.S. Cl.
CPC ...... *G06F 17/5018* (2013.01); *G06F 17/5095* (2013.01); *G06F 2217/44* (2013.01)

(58) Field of Classification Search
USPC .......................................................... 703/2
See application file for complete search history.

(56) References Cited

FOREIGN PATENT DOCUMENTS

| | | |
|---|---|---|
| JP | 2003-337919 A | 11/2003 |
| JP | 2004-239736 A | 8/2004 |
| JP | 2008-275403 A | 11/2008 |

\* cited by examiner

AFTER 10 ns

AFTER 50 ns

AFTER 100 ns

ELECTROMAGNETIC FIELD ANALYSIS METHOD FOR ANISOTROPIC CONDUCTIVE MATERIAL

CROSS-REFERENCE TO RELATED APPLICATIONS

The present application claims priority from Japanese Patent Application No. 2015-062483 filed on Mar. 25, 2015, the entire contents of which are hereby incorporated by reference.

BACKGROUND

1. Technical Field

The present invention relates to electromagnetic field analysis methods for anisotropic conductive materials having anisotropic conductivity.

2. Related Art

When designing airframes of aircrafts, countermeasures against lightning are necessary for preventing, for instance, fuel ignition occurring from sparks caused by lightning strikes. With regard to such a countermeasure against lightning, it is important to clarify the electric current distribution within the airframe when struck by lightning. In order to achieve this, a highly-accurate electromagnetic field analysis method is desired.

With regard to an electromagnetic field analysis method of this kind, a finite-difference time-domain (FDTD) method is widely used (for instance, see Japanese Unexamined Patent Application Publication No. 2001-183404). A FDTD method involves calculating electromagnetic field components (i.e., electric field and magnetic field) along three orthogonal axes by using a cubical computational grid called a Yee grid.

SUMMARY OF THE INVENTION

As a structural material for the airframe of an aircraft, a composite material, such as carbon fiber reinforced plastic (CFRP) with high specific strength, is being put to practical use. For instance, as illustrated in FIG. 9, a pseudo isotropic laminated material obtained by laminating a plurality of fiber layers with fiber directions different from one another by 45° is being widely used.

When performing an electromagnetic field analysis of such a composite material, since each fiber is electrically conductive, the conductivities in the fiber directions have to be set. In other words, in addition to the 0° and 90° directions, the anisotropic conductivity in the 45° direction also has to be simulated.

However, in the FDTD method that simply uses the Yee grid, only the conductivities along the three orthogonal axes can be set. Thus, when the Yee grid is disposed in the) 0° (90° direction, the anisotropic conductivity in the 45° direction cannot be set. Therefore, it is difficult to perform a highly-accurate electromagnetic analysis of such an anisotropic conductive material having anisotropic conductivity.

It is desirable to perform a highly-accurate electromagnetic analysis of an anisotropic conductive material having anisotropic conductivity.

An aspect of the present invention provides an electromagnetic field analysis method for an anisotropic conductive material obtained by laminating a first layer, in which a conductivity in a predetermined first direction is different from a conductivity in another direction, and a second layer, in which a conductivity in a second direction different from the first direction is different from a conductivity in another direction. The electromagnetic field analysis method includes grid-partitioning the first layer by using a first computational grid having a side extending in the first direction and grid-partitioning the second layer by using a second computational grid having a side extending in the second direction; calculating an electromagnetic component of one of an electric field and a magnetic field in the second grid by interpolation from distribution of an electromagnetic component of the one of an electric field and a magnetic field in the first grid; and calculating an electromagnetic component of the other one of the electric field and the magnetic field in the first grid by interpolation from distribution of an electromagnetic component of the other one of the electric field and the magnetic field in the second grid.

A peripheral boundary of an analytic space may be made into a shape of a smooth surface, and only one of the first grid and the second grid may be disposed at a periphery of the analytic space.

The first layer and the second layer may both be disposed within an x-y plane and may be laminated in a z-axis direction, the first grid may be a cubical computational grid extending along three x, y, and z axes that are orthogonal to one another, and the second grid may be a rectangular parallelepiped computational grid with a size that allows the second grid to be inscribed in the first grid. The rectangular parallelepiped computational grid may be constituted of two sides extending in ±45° directions within the x-y plane and one side extending along the z axis.

The anisotropic conductive material may be fiber reinforced plastic in which plastic is reinforced with conductive fiber extending in the first direction and the second direction.

DETAILED DESCRIPTION

An example of the present invention will be described below with reference to the drawings.

First, an analytic model of an electromagnetic field analysis method for an anisotropic conductive material (simply referred to as "electromagnetic field analysis method" hereinafter) according to this example will be described.

Figure 1:
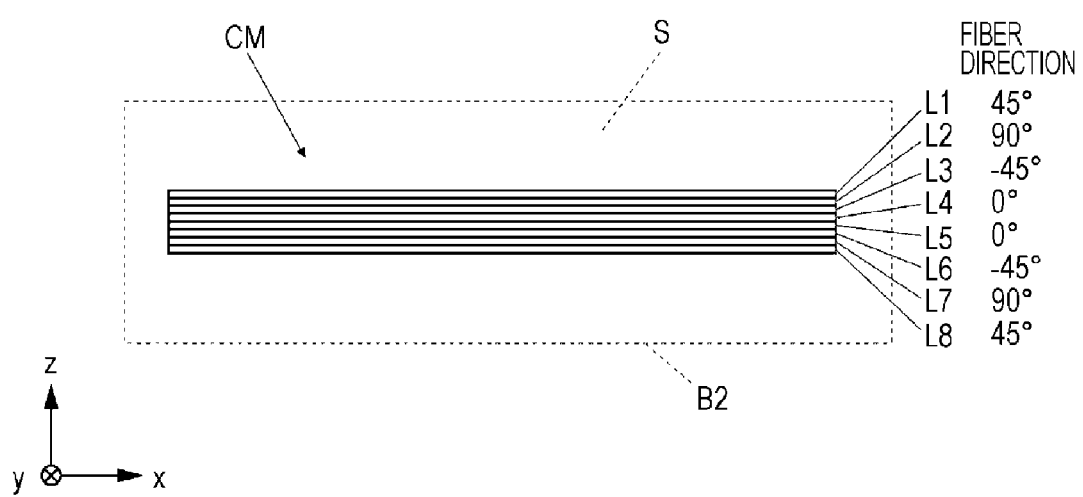
FIG. 1 illustrates an analytic model of an electromagnetic field analysis method.
Figure 2A:
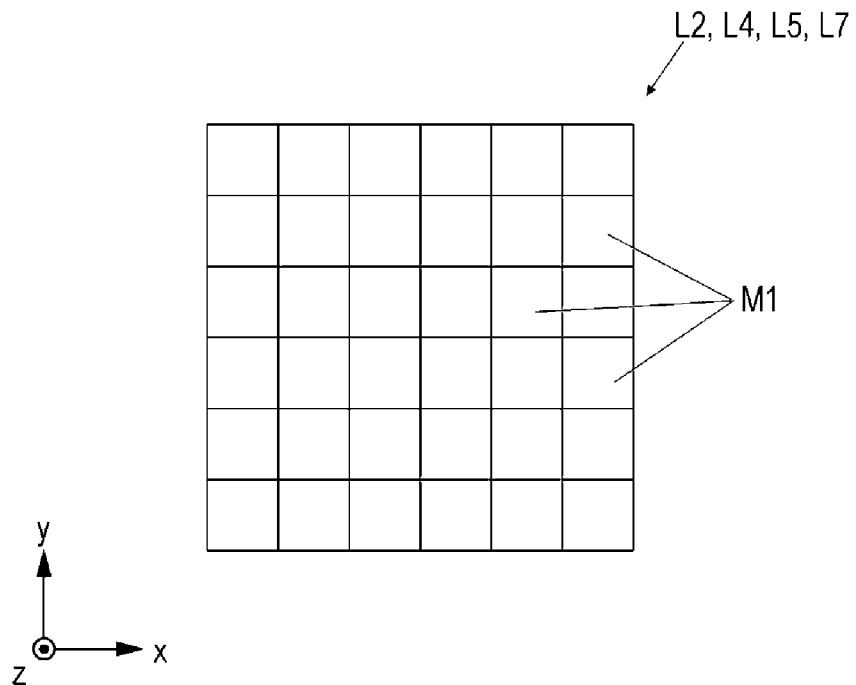
FIG. 2A illustrates a 90-degree grid.
Figure 2B:
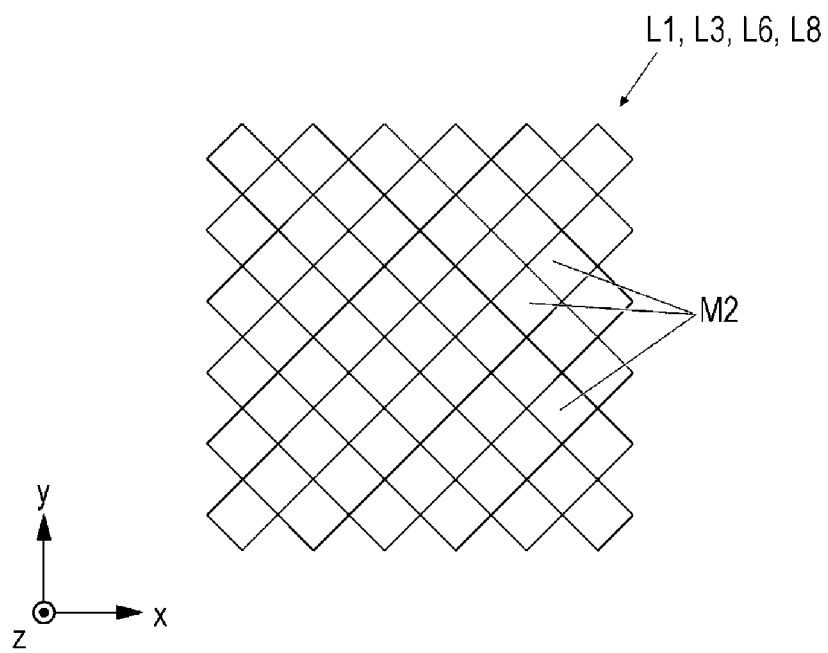
FIG. 2B illustrates a 45-degree grid.
Figure 3:
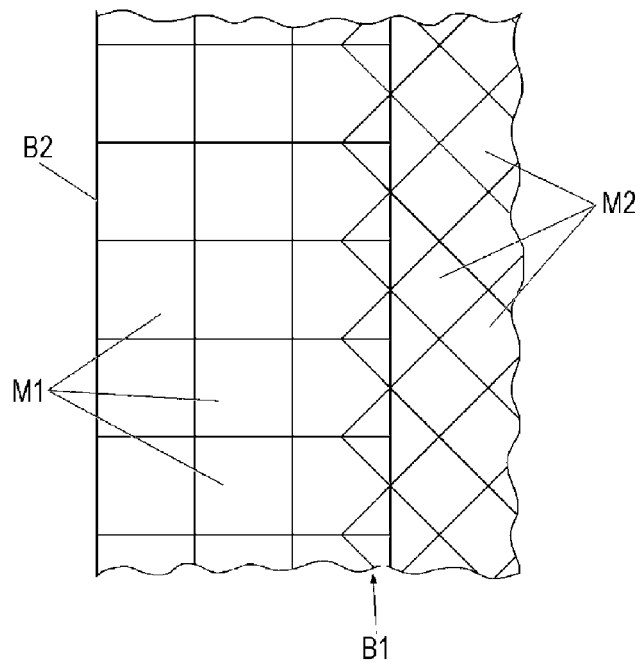
FIG. 3 illustrates how grid-partitioning is realized at the periphery of an analytic space.

FIG. 1 illustrates the analytic model of the electromagnetic field analysis method according to this example. FIGS. 2A and 2B respectively illustrate a 90-degree grid M1 and a 45-degree grid M2, which serve as computational grids and will be described later, and FIG. 3 illustrates how grid-partitioning is realized at the periphery of an analytic space S.

In the electromagnetic field analysis method according to this example, the electromagnetic properties, such as electric current distribution, in a material having anisotropic conductivity (i.e., a composite material CM in this example) are calculated by electromagnetic field analysis software using a finite-difference time-domain (FDTD) method.

In this example, the composite material CM, which is an object to be analyzed, is carbon fiber reinforced plastic (CFRP) in which plastic is reinforced with conductive carbon fiber. More specifically, as illustrated in FIG. 1, the composite material CM is a substantially tabular pseudo isotropic laminated material obtained by laminating two sets of four fiber layers with fiber directions different from one another by 45° (i.e., a total of eight layers). In this example, the eight fiber layers (first layer L1 to eighth layer L8) are disposed within an x-y plane in the analytic space S and are laminated in a z-axis direction.

In the electromagnetic field analysis method according to this example, the entire analytic space S including the composite material CM and a sufficiently large space surrounding the composite material CM is modeled.

Specifically, as illustrated in FIGS. 2A and 2B, the analytic space S is grid-partitioned using the two types of computational grids, that is, the 90-degree grid M1 and the 45-degree grid M2.

The 90-degree grid M1 is a cubical computational grid with sides thereof extending along three orthogonal axes, namely, x, y, and z axes. In other words, in the 90-degree grid M1, two sides thereof within the x-y plane extend in two directions, that is, at 0° (x axis) and 90° (y axis) with reference to the x axis.

The 45-degree grid M2 is a rectangular parallelepiped computational grid with a size that allows the 45-degree grid M2 to be inscribed in the 90-degree grid M1. The 45-degree grid M2 is constituted of two sides extending in the ±45° directions within the x-y plane and one side extending along the z axis.

This grid partitioning is achieved by using computational grids having sides extending in the fiber directions of the layers L1 to L8 of the composite material CM so that electrical conductivities can be set in the fiber directions. In other words, in the composite material CM, the second, fourth, fifth, and seventh layers L2, L4, L5, and L7 with the 0° or 90° fiber direction are grid-partitioned using the 90-degree grid M1, and the first, third, sixth, and eighth layers L1, L3, L6, and L8 with the 45° or −45° fiber direction are grid-partitioned using the 45-degree grid M2.

Furthermore, in this grid partitioning, the space surrounding the composite material CM in the analytic space S is grid-partitioned using a computational grid extending continuously from the composite material CM. Specifically, for instance, a surrounding space continuing from the first layer L1 of the composite material CM within the x-y plane is grid-partitioned using the 45-degree grid M2, which is the same as the first layer L1.

However, as illustrated in FIG. 3, at the periphery of the analytic space S, the 90-degree grid M1 has a predetermined number of columns (i.e., three columns in this example) in the x, y, and z directions. In this case, at the boundary (referred to as "grid boundary" hereinafter) B1 between the 90-degree grid M1 and the 45-degree grid M2, the nodal points of the 45-degree grid M2 partially overlap the 90-degree grid M1 so as to be positioned at the midpoints of the sides thereof.

Therefore, the 90-degree grid M1 is uniformly disposed at the periphery of the analytic space S, and a boundary (referred to as "peripheral boundary" hereinafter) B2 at the periphery of the analytic space S is made into a shape of a smooth surface extending along the x, y, and z axes. Thus, calculation of an absorbing boundary is established at the peripheral boundary B2. In other words, the analytic space S, which is a finite space, can be treated as if it is an infinite space.

If the 45-degree grid M2 is simply disposed at the periphery of the analytic space S in the x-y plane, the peripheral boundary B2 is not made into a shape of a smooth surface (becomes irregular), thus preventing an electromagnetic wave from orthogonally entering the peripheral boundary B2. This causes divergence and reflection to occur at the peripheral boundary B2 at the time of calculation. In this example, the 90-degree grid M1 is disposed in the region surrounding the region grid-partitioned by the 45-degree grid M2 so that the peripheral boundary B2 is made into a shape of a smooth surface, thereby suppressing such divergence and reflection and establishing calculation of an absorbing boundary.

Next, a conversion-calculation method for an electric field and a magnetic field between the 90-degree grid M1 and the 45-degree grid M2 will be described.

Figure 4A:
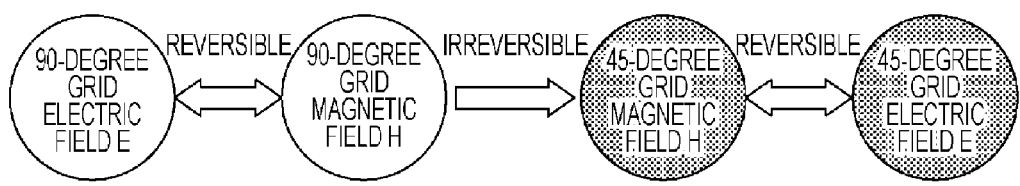
FIGS. 4A and 4B schematically illustrate a conversion-calculation method for an electric field and a magnetic field between the 90-degree grid and the 45-degree grid.
Figure 4B:
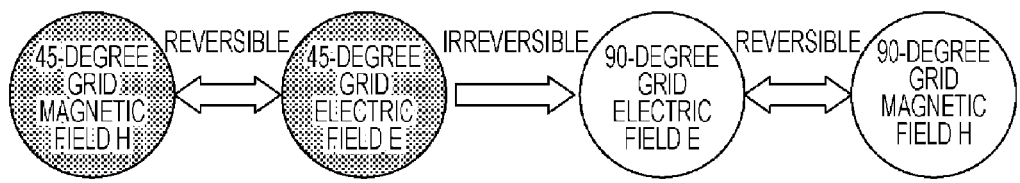
Figure 5A:
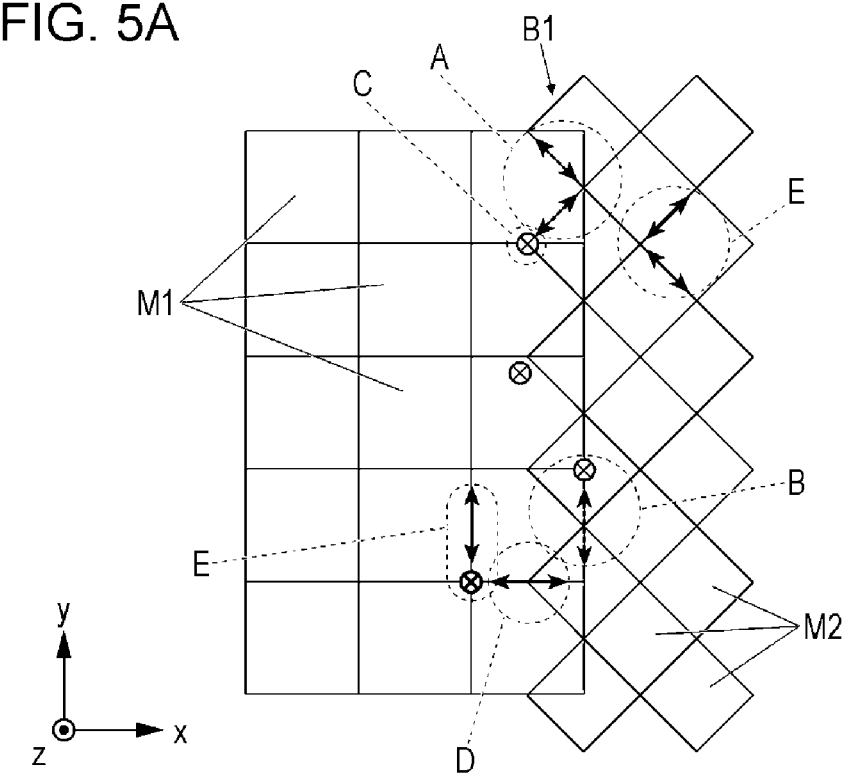
FIG. 5A illustrates how electric-field conversion calculation is performed.
Figure 5B:
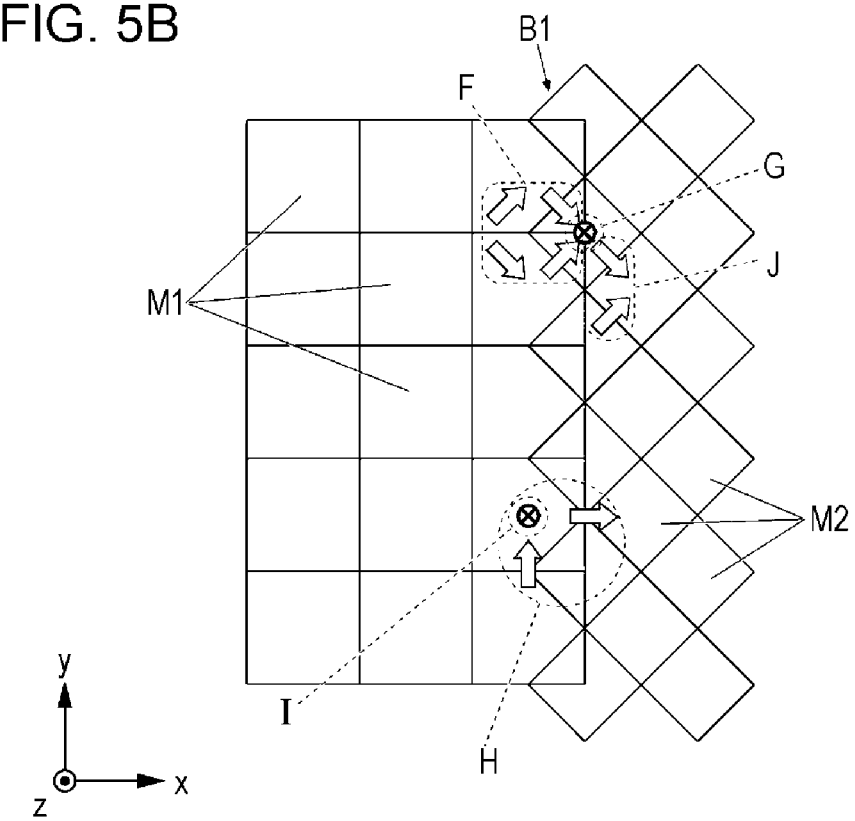
FIG. 5B illustrates how magnetic-field conversion calculation is performed.

FIGS. 4A and 4B schematically illustrate this conversion-calculation method. FIG. 5A illustrates how electric-field conversion calculation is performed. FIG. 5B illustrates how magnetic-field conversion calculation is performed.

As illustrated in FIG. 4A, in this example, a magnetic field in the 45-degree grid M2 is calculated by interpolation from magnetic-field distribution in the 90-degree grid M1, assuming that a magnetic field propagates irreversibly from the 90-degree grid M1 to the 45-degree grid M2. Moreover, it is assumed that an electric field and a magnetic field reversibly propagate in each of the grids M1 and M2.

In contrast, as illustrated in FIG. 4B, an electric field in the 90-degree grid M1 is calculated by interpolation from electric-field distribution in the 45-degree grid M2, assuming that an electric field propagates irreversibly from the 45-degree grid M2 to the 90-degree grid M1. Moreover, it is assumed that an electric field and a magnetic field reversibly propagate in each of the grids M1 and M2.

More specifically, as illustrated in FIG. 5A, electric-field conversion calculation between the grids M1 and M2 is performed as follows.

In the grid boundary B1 where the 90-degree grid M1 and the 45-degree grid M2 overlap each other, the electric field in the 45-degree grid M2 is calculated from the magnetic field in the 90-degree grid M1 and the magnetic field in the 45-degree grid M2 (section A), and the electric field in the 90-degree grid M1 is calculated by interpolation from the electric field in the 45-degree grid M2 (section B).

It should be noted that the electric field in the 45-degree grid M2 along the z axis and the electric field in the 90-degree grid M1 along the x axis are calculated from the magnetic fields in the grids M1 and M2 (sections C and D). Moreover, the electric field in areas other than the grid boundary B1 is also calculated from the magnetic fields in the grids M1 and M2 (section E).

Furthermore, as illustrated in FIG. 5B, magnetic-field conversion calculation between the grids M1 and M2 is performed as follows.

In the grid boundary B1 where the 90-degree grid M1 and the 45-degree grid M2 overlap each other, the magnetic field in the 45-degree grid M2 is calculated by interpolation from the magnetic field in the 90-degree grid M1 (section F).

It should be noted that the magnetic field in the 45-degree grid M2 along the z axis and the magnetic field in the 90-degree grid M1 are calculated from the magnetic fields in the grids M1 and M2 (sections G and H). The magnetic field in the 90-degree grid M1 along the z axis is also used as the magnetic field in the 45-degree grid M2 (section I). Furthermore, the magnetic field in areas other than the grid boundary B1 is also calculated from the electric fields in the grids M1 and M2 (section J).

Figure 6:
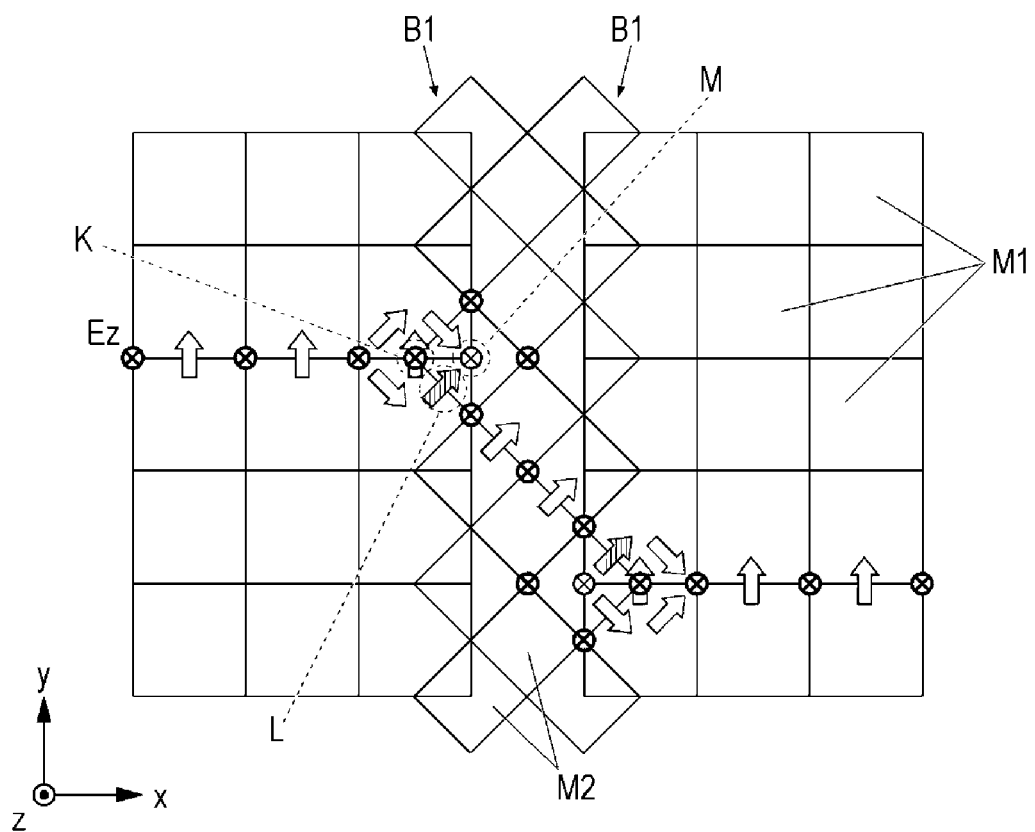
FIG. 6 is an image diagram illustrating how an electric field propagates between the grids in a z-axis direction.

FIG. 6 is an image diagram illustrating how an electric field Ez propagates between the grids M1 and M2 in the z-axis direction.

In the electromagnetic field analysis method according to this example, an electromagnetic wave of the electric field Ez in the 90-degree grid M1 propagates to the 45-degree grid M2, as illustrated in FIG. 6.

In this case, at the grid boundary B1, the electric field in the 45-degree grid M2 along the z axis is calculated from the magnetic field in the 45-degree grid M2 determined from interpolation calculation (section K). Furthermore, the magnetic field in the 45-degree grid M2 in the 45° direction is calculated by interpolation from the magnetic field in the 90-degree grid M1 but is not calculated from the electric field in the 45-degree grid M2 (section L). Moreover, the electric field in the 90-degree grid M1 along the z axis is calculated by interpolation from the electric field in the 45-degree grid M2 (section M).

Figure 7A:
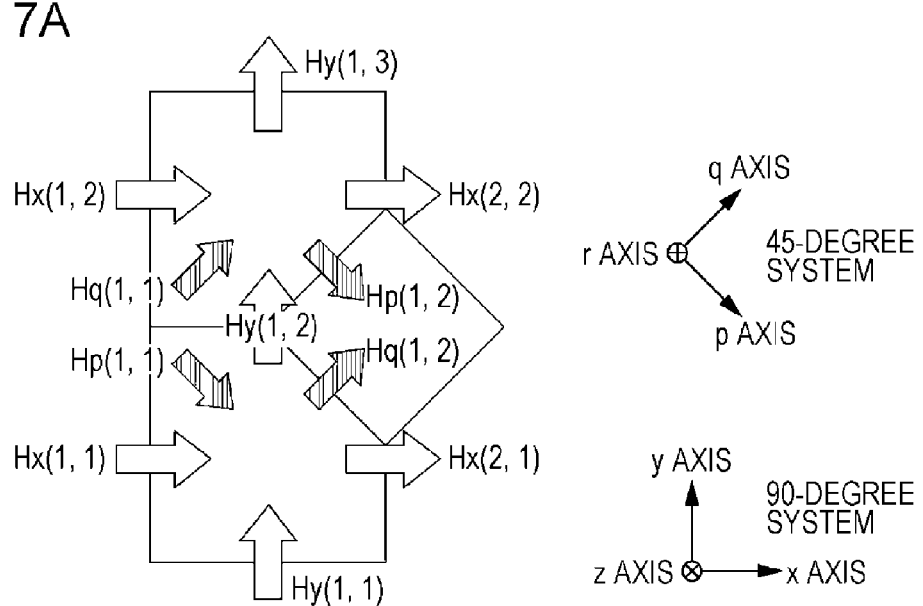
FIGS. 7A and 7B illustrate how interpolation calculation between the grids is performed.
Figure 7B:
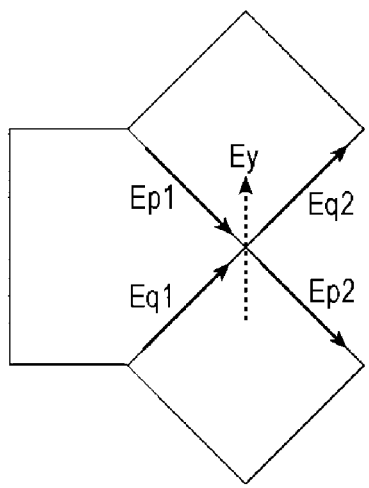
Figure 7B:
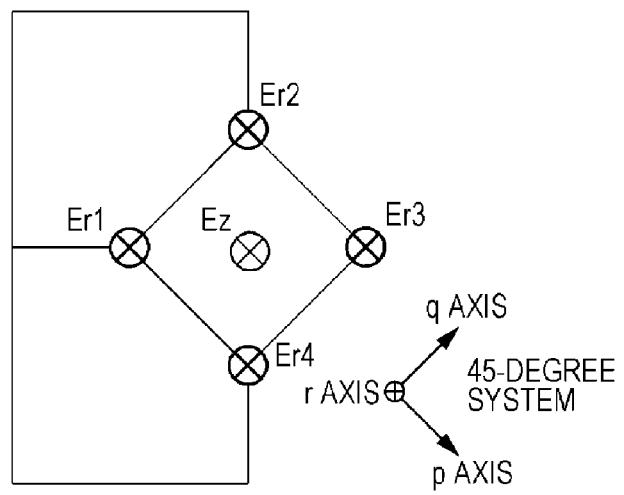

FIGS. 7A and 7B illustrate how interpolation calculation between the grids M1 and M2 is performed.

When performing interpolation calculation for determining the magnetic field in the 45-degree grid M2 from the magnetic-field distribution in the 90-degree grid M1, linear interpolation is performed based on expressions 1 to 4 below, assuming that the magnetic field is distributed linearly within the 90-degree grid M1.

$$Hq(1, 1) = \frac{3Hx(1, 2) + Hx(2, 2) + 3Hy(1, 2) + Hy(1, 3)}{4\sqrt{2}} \quad (1)$$

$$Hp(1, 1) = \frac{3Hx(1, 1) + Hx(2, 1) - Hy(1, 1) - 3Hy(1, 2)}{4\sqrt{2}} \quad (2)$$

$$Hq(2, 1) = \frac{Hx(1, 1) + 3Hx(2, 1) + Hy(1, 1) + 3Hy(1, 2)}{4\sqrt{2}} \quad (3)$$

$$Hp(1, 2) = \frac{Hx(1, 2) + 3Hx(2, 2) - 3Hy(1, 2) - Hy(1, 3)}{4\sqrt{2}} \quad (4)$$

As illustrated in FIG. 7A, Hp and Hq each denote a magnetic field in the 45-degree grid M2 having a 45-degree coordinate system with three orthogonal axes, namely, p, q, and r axes, and Hx and Hy each denote a magnetic field in the 90-degree grid M1.

In interpolation calculation for determining the electric field in the 90-degree grid M1 from the electric-field distribution in the 45-degree grid M2, linear interpolation is performed based on expressions 5 and 6 below, assuming that the electric field is distributed linearly within the 45-degree grid M2.

$$Ey = \frac{Eq1 + Eq2 - Ep1 - Ep2}{2\sqrt{2}} \quad (5)$$

$$Ez = \frac{Er1 + Er2 + Er3 + Er4}{4} \quad (6)$$

As illustrated in FIG. 7B, Ey and Ez each denote an electric field in the 90-degree grid M1, and Ep, Eq, and Er each denote an electric field in the 45-degree grid M2 having a 45-degree coordinate system with three orthogonal axes, namely, p, q, and r axes.

The following description with reference to an analytic example relates to how an electromagnetic wave propagates astride the grid boundary B1.

In this analytic example, an electromagnetic wave pulse is applied to the center of an analytic model, which is obtained by grid-partitioning a central section by using the 45-degree grid M2 and grid-partitioning a region surrounding the central section by using the 90-degree grid M1. Then, it is checked how this electromagnetic wave propagates astride the grid boundary B1.

Figure 8A:
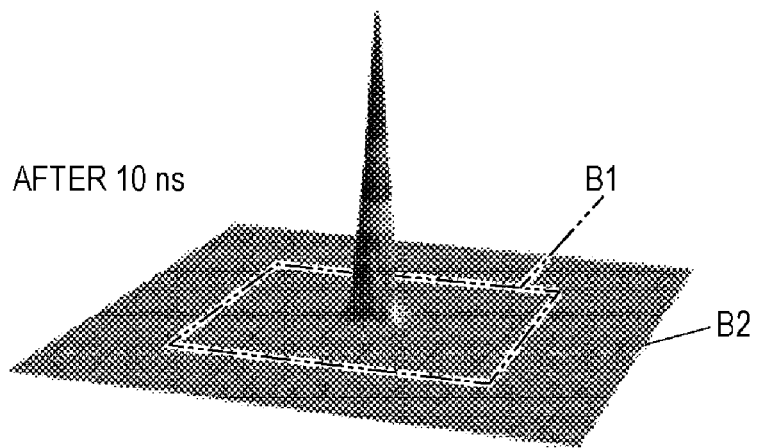
FIGS. 8A to 8C are diagrams illustrating the results of an analytic example.
Figure 8B:
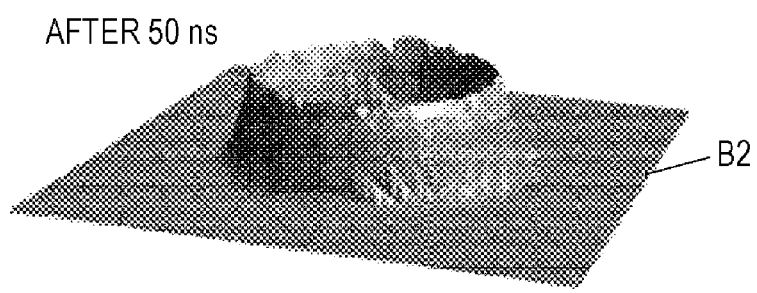
Figure 8C:
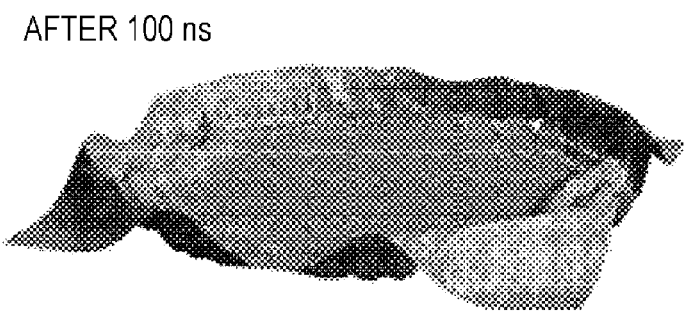
Figure 9:
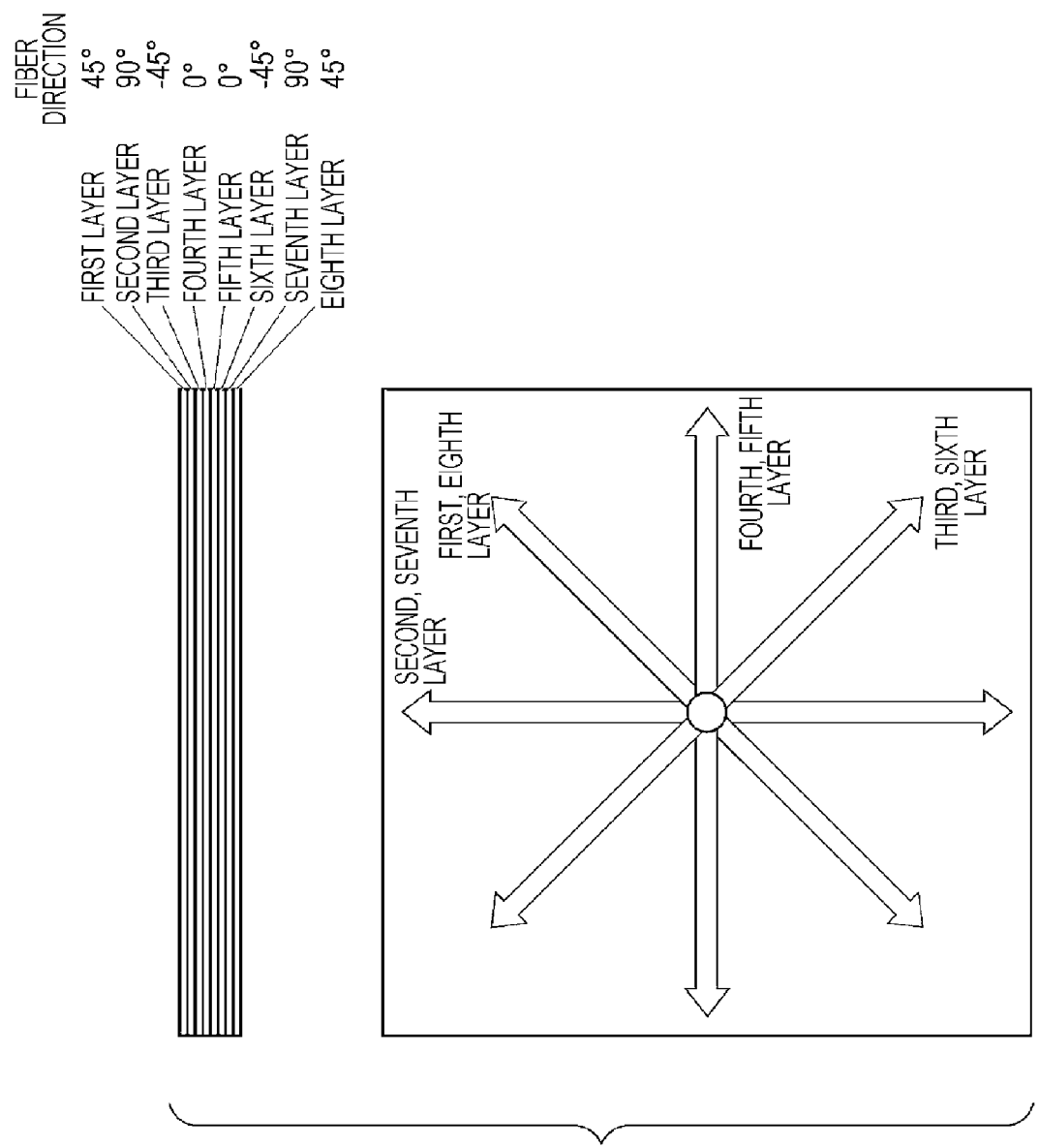
FIG. 9 illustrates a pseudo isotropic laminated material.

FIGS. 8A to 8C are diagrams illustrating the results of this analytic example, and illustrate electric-field intensities in the x-y plane after 10 ns, 50 ns, and 100 ns from the application of the electromagnetic wave pulse.

As illustrated in FIGS. 8A to 8C, in this analytic example, it is clear that the electromagnetic wave according to the applied electromagnetic wave pulse propagates smoothly astride the grid boundary B1, indicated with a two-dot chain line, from the 45-degree grid M2 to the 90-degree grid M1.

Moreover, it is clear that calculation of an absorbing boundary is appropriately executed at the peripheral boundary B2 of the analytic space S without causing divergence and reflection to occur.

According to this example, the second, fourth, fifth, and seventh layers of the composite material CM are grid-partitioned by the 90-degree grid M1 having sides extending in the 0° direction and the 90° direction within the x-y plane, and the remaining first, third, sixth, and eight layers are grid-partitioned by the 45-degree grid M2 having sides extending in the ±45° directions within the x-y plane. Thus, the conductivities in the 0° direction and the 90° direction in the second, fourth, fifth, and seventh layers and the conductivities in the ±45° directions in the first, third, sixth, and eight layers can be set individually.

Furthermore, the magnetic field in the 45-degree grid M2 is calculated by interpolation from the magnetic-field distribution in the 90-degree grid M1, and the electric field in the 90-degree grid M1 is calculated by interpolation from the electric-field distribution in the 45-degree grid M2. Thus, electromagnetic-wave propagation calculation between the 90-degree grid M1 and the 45-degree grid M2 can be executed seamlessly.

Therefore, an electromagnetic field analysis of the composite material CM obtained by laminating the first, third, sixth, and eight layers and the second, fourth, fifth, and seventh layers having anisotropic conductivity can be performed with high accuracy.

Furthermore, the peripheral boundary B2 of the analytic space S is made into a shape of a smooth surface, and the 90-degree grid M1 alone is disposed at the periphery of the analytic space S.

Thus, the occurrence of divergence and reflection at the peripheral boundary B2 can be suppressed at the time of calculation, and calculation of an absorbing boundary that treats the analytic space S, which is a finite space, as an infinite space can be established.

An example to which the present invention is applicable is not limited to the above example, and is appropriately modifiable within a scope that does not depart from the spirit of the invention.

For instance, in the above example, the magnetic field in the 45-degree grid M2 is calculated by interpolation from the magnetic-field distribution in the 90-degree grid M1, and the electric field in the 90-degree grid M1 is calculated by interpolation from the electric-field distribution in the 45-degree grid M2. Alternatively, the electric field and the magnetic field may be interchanged in these interpolation calculations. In other words, the electric field in the 45-degree grid M2 may be calculated by interpolation from the electric-field distribution in the 90-degree grid M1, and the magnetic field in the 90-degree grid M1 may be calculated by interpolation from the magnetic-field distribution in the 45-degree grid M2.

Furthermore, at least one of the 90-degree grid M1 and the 45-degree grid M2 may be disposed at the periphery of the analytic space S, and the periphery may have the 45-degree grid M2 alone disposed therein instead of the 90-degree grid M1 so long as the peripheral boundary B2 can be made into a shape of a smooth surface.

Moreover, in the interpolation calculations of the electric field and the magnetic field between the grids M1 and M2, linear interpolations are executed assuming that the electric field and the magnetic field are distributed linearly in each grid. Alternatively, an interpolation method other than the linear interpolation method may be used in accordance with the distribution condition in each grid.

Furthermore, the anisotropic conductive material according to the example of the present invention is not particularly limited so long as the material is obtained by laminating a first layer, in which the conductivity in a predetermined first direction is different from that in another direction, and a second layer, in which the conductivity in a second direction different from the first direction is different from that in another direction. The anisotropic conductive material does not have to be a pseudo isotropic laminated material and does not have to be fiber reinforced plastic.

Furthermore, in this example, a substantially tabular pseudo isotropic laminated material obtained by laminating two sets of four fiber layers with fiber directions different from one another by 45° (i.e., a total of eight layers) is used as the analytic model, as illustrated in FIG. 1. Alternatively, the analytic model according to the example of the present invention may have any number of layers, and the 0°, 90°, 45°, and −45° fiber directions may be in any order.

Furthermore, the aforementioned analytic model may be obtained by laminating a plurality of fiber layers with different fiber directions, and the fiber directions of the plurality of fiber layers may be varied at an angle other than 45°. However, in this case, it is needless to say that computational grids having sides extending in the fiber directions are to be used, and that the interpolation calculations of electromagnetic field components between the grids are to be executed by using calculation expressions corresponding to the angle between the fiber directions.

The invention claimed is:

1. An electromagnetic field analysis method for an anisotropic conductive material comprising:
    setting an analytic model modeling an analytic object comprising an anisotropic conductive material to a computer, the analytic model including a first layer in which a conductivity in a predetermined first direction is different from a conductivity in another direction, and a second layer in which a conductivity in a second direction different from the first direction is different from a conductivity in another direction; and calculating by the computer one or more electromagnetic properties in the anisotropic conductive material with a computer software using a finite-difference time-domain method,
    wherein the calculating the one or more electromagnetic properties comprising:
        grid-partitioning the first layer by using a first computational grid having a side extending in the first direction and grid-partitioning the second layer by using a second computational grid having a side extending in the second direction;
        calculating an electromagnetic component of one of an electric field and a magnetic field in the second grid by interpolation from distribution of an electromagnetic component of the one of an electric field and a magnetic field in the first grid; and
        calculating an electromagnetic component of the other one of the electric field and the magnetic field in the first grid by interpolation from distribution of an electromagnetic component of the other one of the electric field and the magnetic field in the second grid,
    wherein the analytic model comprises an analytic space modeling the analytic object comprising the anisotropic conductive material and a space surrounding the anisotropic conductive material, and
    wherein the computer makes a peripheral boundary of the analytic space into a shape of a smooth surface, and only one of the first computational grid and the second computational grid is disposed at a periphery of the analytic space,
    wherein the shape of the smooth surface of the analytic space is used to manufacture the anisotropic conductive material.

2. The electromagnetic field analysis method for the anisotropic conductive material according to claim 1,
    wherein the first layer and the second layer are both disposed within an x-y plane and are laminated in a z-axis direction,
    wherein the first computational grid comprises a cubical computational grid extending along three x, y, and z axes that are orthogonal to one another, and
    wherein the second computational grid comprises a rectangular parallelepiped computational grid with a size that allows the second computational grid to be inscribed in the first computational grid, the rectangular parallelepiped computational grid being constituted of two sides extending in ±45° directions within the x-y plane and one side extending along the z axis.

3. The electromagnetic field analysis method for the anisotropic conductive material according to claim 1,
    wherein the anisotropic conductive material is fiber reinforced plastic in which plastic is reinforced with conductive fiber extending in the first direction and the second direction.

4. The electromagnetic field analysis method for the anisotropic conductive material according to claim 2,
    wherein the anisotropic conductive material is fiber reinforced plastic in which plastic is reinforced with conductive fiber extending in the first direction and the second direction.

5. An electromagnetic field analysis apparatus for an anisotropic conductive material comprising:
    an analytic model modeling an analytic object comprising an anisotropic conductive material to a computer, the analytic model including a first layer in which a conductivity in a predetermined first direction is different from a conductivity another direction, and a second layer in which a conductivity in a second direction different from the first direction is different from a conductivity in another direction; and one or more electromagnetic properties in the anisotropic conductive material calculated by the computer with a computer software using a finite-difference time-domain method, wherein the one or more electromagnetic properties is calculated comprising:

grid-partition the first layer by using a first computational grid having a side extending in the first direction and grid-partitioning the second layer by using a second computational grid having a side extending in the second direction;

calculate an electromagnetic component of one of an electric field and a magnetic field in the second grid by interpolation from distribution of an electromagnetic component of the one of an electric field and a magnetic field in the first grid; and calculate an electromagnetic component of the other one of the electric field and the magnetic field in the first grid by interpolation from distribution of an electromagnetic component of the other one of the electric field and the magnetic field in the second grid, wherein the analytic model comprises an analytic space modeling the analytic object comprising the anisotropic conductive material and a space surrounding the anisotropic conductive material; and wherein the computer makes a peripheral boundary of the analytic space into a shape of a smooth surface, and only one of the first computational grid and the second computational grid is disposed at a periphery of the analytic space, wherein the shape of the smooth surface of the analytic space is used to manufacture the anisotropic conductive material.

6. The electromagnetic field analysis apparatus for the anisotropic conductive material according to claim 5, wherein the first layer and the second layer are both disposed within an x-y plane and are laminated in a z-axis direction, wherein the first computational grid comprises a cubical computational grid extending along three x, y, and z axes that are orthogonal to one another, and wherein the second computational grid comprises a rectangular parallelepiped computational grid with a size that allows the second computational grid to be inscribed in the first computational grid, the rectangular parallelepiped computational grid being constituted of two sides extending in +45° directions within the x-y plane and one side extending along the z axis.

7. The electromagnetic field analysis apparatus for the anisotropic conductive material according to claim 5, wherein the anisotropic conductive material is fiber reinforced plastic in which plastic is reinforced with conductive fiber extending in the first direction and the second direction.

8. The electromagnetic field analysis apparatus for the anisotropic conductive material according to claim 6, wherein the anisotropic conductive material is fiber reinforced plastic in which plastic is reinforced with conductive fiber extending in the first direction and the second direction.

* * * * *